US012590218B2

(12) United States Patent
Tasaki et al.

(10) Patent No.: US 12,590,218 B2
(45) Date of Patent: Mar. 31, 2026

(54) AQUEOUS FLUORESCENT INK, INK CARTRIDGE AND INK JET RECORDING METHOD

(71) Applicant: CANON KABUSHIKI KAISHA, Tokyo (JP)

(72) Inventors: Saki Tasaki, Kanagawa (JP); Daiji Okamura, Tokyo (JP); Satoru Kobayashi, Kanagawa (JP); Hirohiko Yuasa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 995 days.

(21) Appl. No.: 17/712,450

(22) Filed: Apr. 4, 2022

(65) Prior Publication Data

US 2022/0348781 A1 Nov. 3, 2022

(30) Foreign Application Priority Data

Apr. 23, 2021 (JP) ................................ 2021-073121
Mar. 11, 2022 (JP) ................................ 2022-038203

(51) Int. Cl.
*C09D 11/50* (2014.01)
*B41M 5/00* (2006.01)
(Continued)

(52) U.S. Cl.
CPC ........... *C09D 11/50* (2013.01); *B41M 5/0023* (2013.01); *C09D 11/033* (2013.01);
(Continued)

(58) Field of Classification Search
CPC ..... C09D 11/50; C09D 11/033; C09D 11/037; C09D 11/102; C09D 11/322; C09D 11/328; B41M 5/0023; C09K 11/06
(Continued)

(56) References Cited

U.S. PATENT DOCUMENTS 7,144,452 B2 12/2006 Takayama et al.
7,160,372 B2 1/2007 Yoshizawa et al.
(Continued)

FOREIGN PATENT DOCUMENTS

CN 101117468 A * 2/2008 ............. C09D 11/32
JP 2008-037976 A 2/2008
(Continued)

OTHER PUBLICATIONS

CN-101117468-A English translation (Year: 2008).*
Japanese Office Action issued in corresponding Japanese Application No. 2022-038203 dated Sep. 7, 2025.

*Primary Examiner* — Anita Nassiri-Motlagh
(74) *Attorney, Agent, or Firm* — Venable LLP

(57) ABSTRACT

Provided are an aqueous fluorescent ink with which a fluorescent color image having an excellent color developability and lightfastness can be recorded, and an ink cartridge and an ink jet recording method using this aqueous fluorescent ink. The aqueous fluorescent ink contains a resin particle dyed with a fluorescent dye, and a quinacridone pigment. The fluorescent dye includes a basic dye having a xanthene skeleton. The resin particle has a cyano group-containing unit. A mass ratio of a content (% by mass) of the quinacridone pigment to a content (% by mass) of the fluorescent dye is 1.0 times or less. The ink cartridge includes an ink storage portion storing this aqueous fluorescent ink. An image is recorded onto a recording medium by the ink jet recording method comprising ejecting the aqueous fluorescent ink from an ink jet recording head.

18 Claims, 2 Drawing Sheets

(51) Int. Cl.

| | |
|---|---|
| ***C09D 11/033*** | (2014.01) |
| ***C09D 11/037*** | (2014.01) |
| ***C09D 11/102*** | (2014.01) |
| ***C09D 11/322*** | (2014.01) |
| ***C09D 11/328*** | (2014.01) |
| ***C09K 11/06*** | (2006.01) |

(52) U.S. Cl.
CPC .......... *C09D 11/037* (2013.01); *C09D 11/102* (2013.01); *C09D 11/322* (2013.01); *C09D 11/328* (2013.01); *C09K 11/06* (2013.01); *C09K 2211/1018* (2013.01)

(58) Field of Classification Search
USPC ..................................................... 252/301.35
See application file for complete search history.

(56) References Cited

U.S. PATENT DOCUMENTS

| | | | |
|---|---|---|---|
| 7,198,664 | B2 | 4/2007 | Mafune et al. |
| 7,198,665 | B2 | 4/2007 | Nakamura et al. |
| 7,201,791 | B2 | 4/2007 | Okamura et al. |
| 7,247,194 | B2 | 7/2007 | Okamura et al. |
| 7,247,196 | B2 | 7/2007 | Sato et al. |
| 7,270,701 | B2 | 9/2007 | Jinnou et al. |
| 7,297,197 | B2 | 11/2007 | Jinnou et al. |
| 7,553,358 | B2 | 6/2009 | Okamura et al. |
| 7,566,362 | B2 | 7/2009 | Mori et al. |
| 7,611,571 | B2 | 11/2009 | Yamashita et al. |
| 7,618,484 | B2 | 11/2009 | Fujimoto et al. |
| 7,682,433 | B2 | 3/2010 | Yanagimachi et al. |
| 7,699,924 | B2 | 4/2010 | Mafune et al. |
| 8,016,932 | B2 | 9/2011 | Okamura et al. |
| 8,029,612 | B2 | 10/2011 | Ishii et al. |
| 8,123,846 | B2 | 2/2012 | Yamakami et al. |
| 8,845,085 | B2 | 9/2014 | Kobayashi et al. |
| 8,939,570 | B2 | 1/2015 | Mori et al. |
| 9,169,413 | B2 | 10/2015 | Shiiba et al. |
| 9,452,608 | B2 | 9/2016 | Okamura et al. |
| 9,738,803 | B2 | 8/2017 | Horiuchi et al. |
| 10,125,284 | B2 | 11/2018 | Gouda et al. |
| 10,131,806 | B2 | 11/2018 | Hayashi et al. |
| 10,253,197 | B2 | 4/2019 | Shiiba et al. |
| 10,301,495 | B2 | 5/2019 | Okamura |
| 11,643,560 | B2 | 5/2023 | Hasegawa |
| 2014/0024763 | A1 | 1/2014 | Jinnou et al. |
| 2021/0001636 | A1 | 1/2021 | Okamura et al. |
| 2021/0002470 | A1 | 1/2021 | Kishi et al. |

FOREIGN PATENT DOCUMENTS

| | | | |
|---|---|---|---|
| JP | 2009-155488 | A | 7/2009 |
| JP | 2009-161688 | A | 7/2009 |
| JP | 2009209183 | A | 9/2009 |
| JP | 2020196862 | A | 12/2020 |
| JP | 2021008112 | A | 1/2021 |
| JP | 2021008598 | A | 1/2021 |

* cited by examiner

AQUEOUS FLUORESCENT INK, INK CARTRIDGE AND INK JET RECORDING METHOD

BACKGROUND OF THE INVENTION

Field of the Invention

The present invention relates to an aqueous fluorescent ink, an ink cartridge and an ink jet recording method.

Description of the Related Art

In the printing industry, there has been a need to expand an expressible color gamut. Color gamut standards include PANTONE certification (X-rite), Japan Color Certification (Japan Printing Machinery Association), DIC Color Guide Certification (DIC Corporation), Kaleido certification (TOYO INK CO., LTD.) and the like. In recent years, ink jet recording apparatuses employing inks of special colors other than the basic colors of cyan, magenta and yellow or inks of special colors having high lightness have started to be used in order to expand a color gamut.

Another need in the printing industry is to manufacture recorded products with eye-catching vivid colors. For example, notices such as posters and POP advertisements and the packages of food and beverage products need to be recorded in vivid colors in order to catch the eyes of customers. From the viewpoint of satisfying such a need, fluorescent colors are considered to be beneficial. A fluorescent material suitable for paints, inks and the like has been proposed (Japanese Patent Application Laid-Open No. 2009-161688). The current situation, however, is that a fluorescent material sufficiently suitable for ink jet printing has not yet been created.

On the other hand, there have been proposals that, in order to improve the color developability of an image in a magenta region to be recorded with a pigment ink, a fluorescent dye is added to the ink (Japanese Patent Application Laid-Open Nos. 2008-037976 and 2009-155488).

Offset printing is currently the mainstream method of recording a fluorescent color image. With offset printing, however, it is difficult for a fluorescent color image to achieve vivid color developability only by performing printing once. For this reason, it has been a common practice to perform overprinting twice or more. Hence, the method of recording a fluorescent color image having an excellent color developability by overprinting has problems in productivity and cost.

With digital recording using an electrophotographic method, it is possible to record a fluorescent color image with a high color developability by using a liquid toner. The electrophotographic method, however, has restriction on the recording medium, which makes, for example, application to textile recording, expansion to large formats, application to thick materials, etc. difficult.

In contrast, digital recording using an ink jet method is applicable to various recording media by virtue of its non-contact nature that the recording head, which ejects an ink, does not contact the recording medium. However, the digital recording using an ink jet method involves ejecting an ink through fine nozzles on the order of micrometers by applying mechanical energy or thermal energy thereto, and is therefore apt to be restricted by the ink's physical properties such as viscosity. In particular, many of materials that govern the performance of an ink, such as a coloring material and resin, are solid, and these materials need to be dissolved or dispersed in a liquid medium such as water or an organic solvent in order to be added to the ink, which poses a restriction on the amount of the ink to be added. The same applies to fluorescent coloring materials such as fluorescent dyes. Adding a sufficient amount of a fluorescent coloring material to an ink for the purpose of aiming recording an image with an excellent color developability will be restricted by physical properties of the ink.

Also, fluorescent dyes decompose in a chain reaction by reacting with radicals generated by light (ultraviolet ray) or ozone hitting their molecules. It has been found that this causes problems in the lightfastness of images. With the inks proposed in Japanese Patent Application Laid-Open Nos. 2008-037976 and 2009-155488, it is possible to improve the color developability (chroma) of an image in a magenta region to be recorded with a pigment ink. However, these inks lack the color developability required for fluorescent color images, i.e., high chroma and high lightness as well as excellent fluorescence intensity and there is room for further improvement.

SUMMARY OF THE INVENTION

An object of the present invention is to provide an aqueous fluorescent ink with which a fluorescent color image having an excellent color developability and lightfastness can be recorded. Also, another object of the present invention is to provide an ink cartridge and an ink jet recording method using this aqueous fluorescent ink.

The present invention provides an ink jet aqueous fluorescent ink containing a resin particle dyed with a fluorescent dye, and a quinacridone pigment, in which the fluorescent dye includes a basic dye having a xanthene skeleton, the resin particle has a cyano group-containing unit, and a mass ratio of a content (% by mass) of the quinacridone pigment to a content (% by mass) of the fluorescent dye is 1.0 times or less.

Further features of the present invention will become apparent from the following description of exemplary embodiments with reference to the attached drawings.

BRIEF DESCRIPTION OF THE DRAWINGS

FIG. 2A is a perspective view of a main part of the ink jet recording apparatus, and FIG. 2B is a perspective view of a head cartridge.

DESCRIPTION OF THE EMBODIMENTS

Figure 1:
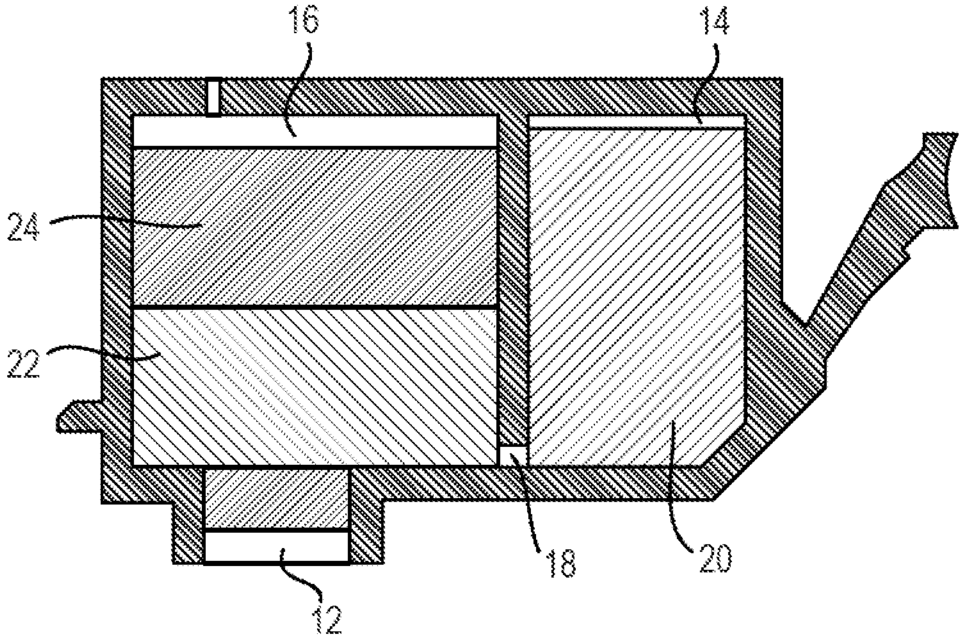
FIG. 1 is a cross-sectional view schematically illustrating one embodiment of an ink cartridge of the present invention.

The present invention will further be described below in detail through a preferred embodiment. In the present invention, when a compound is a salt, the salt is dissociated into ions in ink, and this state will be expressed as "containing a salt" for convenience. Also, an ink jet aqueous fluorescent ink will also be referred to simply as "ink". Physical property values are values at normal temperature (25° C.) unless otherwise noted. In the present invention, each "unit" forming a resin means a repeating unit derived from a single monomer.

The present inventors have made studies on the composition of an ink with which a fluorescent color image having an excellent color developability and lightfastness can be recorded. In particular, the present inventors have made studies by mainly focusing on expanding the color gamut in a high-lightness region which is difficult to express with the basic colors, in order to improve the color developability of images. To expand the color gamut in the high-lightness region, it is preferable to use a dye that exhibits fluorescence as a coloring material.

Of dyes that exhibit fluorescence, a basic dye having a xanthene skeleton is effective for expanding the color gamut. However, it has been found that decomposition of a fluorescent dye proceeds as a result of a chain reaction with radicals generated by light (ultraviolet ray) or ozone hitting its molecules, thereby lowering the lightfastness of an image. As a result of making studies on means capable of expanding the color gamut in the high-lightness region and suppressing the decrease in lightfastness, the present inventors have found that it is effective to use a quinacridone pigment in addition to a basic dye that has a xanthene skeleton and exhibits fluorescence. In the following, "a basic dye that has a xanthene skeleton and exhibits fluorescence" will also be referred to simply as "fluorescent dye".

The present inventors have attempted to add a fluorescent dye itself to an ink. However, they have found that increasing the amount of the fluorescent dye to be added in order to achieve a desired level of color developability improves the chroma of an image but significantly lowers its lightness. This is considered to be due to the concentration quenching specific to fluorescent materials. From the above, it has been found that it is essential to dye a resin particle (resin particles) with the fluorescent dye and add them to the ink. When the resin particle is dyed with the fluorescent dye, the fluorescent dye is fixed to the resin particle. This can suppress the decrease in the color developability (lightness) of an image.

Common methods of dyeing a resin particle with a fluorescent dye include: (i) a method called addition-condensation bulk resin crushing in which a bulk resin is condensed, dyed and then crushed to obtain a particle; and (ii) a method in which a resin particle is prepared and dyed in an aqueous system by emulsion polymerization. The resin particle obtained by the method (i) has a size on the order of micrometers and also has low water dispersibility, and is therefore difficult to apply to inks for ink jet recording methods. On the other hand, the resin particle obtained by the method (ii) is applicable to an aqueous system and also its size can be controlled to be on the order of nanometers. Thus, this resin particle has excellent suitability for ink jet printing. However, by studying the color developability by using an ink containing a conventional resin particle prepared by the method (ii), it has been found that some problems occur.

This has led the present inventors to study the color developability of images recorded with an ink containing a resin particle dyed with a fluorescent dye. To enhance the color developability of an image, it is important to dye the resin with the fluorescent dye via a strong interaction. The present inventors have therefore made studies on the composition of a resin particle to be efficiently dyed with a fluorescent dye according to properties of the fluorescent dye.

Firstly, with a basic fluorescent dye having a positively polarized moiety and a resin having a cyano group-containing unit as a group having the negative polarity, the present inventors have found that a high color developability can be achieved by dyeing the resin with the fluorescent dye with use of an electrostatic action.

Incidentally, dyes that exhibit fluorescence are low in lightfastness, which leads to a problem that, with only a fluorescent dye, radicals generated from the fluorescent dye attack the nearby fluorescent dye, causing a chain reaction and decomposition. In view of this, the present inventors have made further studies and found that the lightfastness of an image may be improved by using a fluorescent dye (i.e., a basic dye that has a xanthene skeleton and exhibits fluorescence) and a quinacridone pigment together. In particular, lightfastness can be specifically improved by using a quinacridone pigment among various pigments in combination with the basic dye. However, the present inventors have also found that, even when these pigment and dye are used, the balance between the color developability and the lightfastness required for fluorescent color images is not sufficient depending on the ratio between the fluorescent dye and the quinacridone pigment. Specifically, the present inventors have found that the mass ratio of the content (% by mass) of the quinacridone pigment to the content (% by mass) of the fluorescent dye in the ink needs to be 1.0 times or less.

The present inventors assumes that a fluorescent color image having an excellent color developability and lightfastness can be recorded with the above composition for the following reasons. The π-π bond between a heterocyclic ring of the xanthene skeleton and a heterocyclic ring of the quinacridone pigment, the hydrogen bond between the oxygen atom of the xanthene skeleton and a hydrogen atom of the quinacridone pigment and the π-π bond between their aromatic groups cause strong interactions. Further, on a recording medium with the ink applied thereto, the fluorescent dye is present around the quinacridone pigment when the mass ratio of the quinacridone pigment to the fluorescent dye (pigment/fluorescent dye) is 1.0 times or less. As a result, the quinacridone pigment receives radicals generated by light (ultraviolet ray) or ozone hitting the fluorescent dye, thereby suppressing the radicals' chain attack on the fluorescent dye. For the above reasons, it is considered that the color developability and the lightfastness can be improved in a balanced manner.

<Aqueous Fluorescent Ink>

An ink of the present invention is an ink jet aqueous fluorescent ink containing a resin particle dyed with a fluorescent dye, and a pigment. "Fluorescent ink" refers to an ink with which a fluorescent color image can be recorded. A fluorescent color image is an image that emits fluorescence in response to an ultraviolet or visible excitation light beam. The fluorescent dye is a basic dye that has a xanthene skeleton and exhibits fluorescence. The pigment is a quinacridone pigment. The resin particle has a cyano group-containing unit. The mass ratio of the content (% by mass) of the quinacridone pigment to the content (% by mass) of the fluorescent dye is 1.0 times or less.

Constituent components of the ink will be described below. The present invention is not limited to the following description as long as the gist thereof is not exceeded. In the following, the terms "(meth)acrylic acid", "(meth)acrylate" and "(meth)acryloyl" represent "acrylic acid, methacrylic acid", "acrylate, methacrylate" and "acryloyl, methacryloyl", respectively. The fluorescent ink of the present invention does not need to be of a type to be cured by an activation energy beam, and does not therefore need to contain a monomer having a polymerizable group or the like.

(Fluorescent Dye)

The ink contains a resin particle dyed with a fluorescent dye. The fluorescent dye contains a basic dye that has a xanthene skeleton. The xanthene skeleton is represented by the following formula (1).

(1)

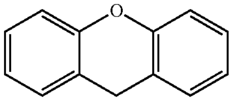

"Fluorescent dye" herein refers to a dye that emits fluorescence, i.e., exhibits fluorescence, in response to an ultraviolet or visible excitation light beam. Whether a dye is a "fluorescent dye", which exhibits fluorescence, can be determined by following the method described below, for example. A sample obtained by dissolving the dye in a liquid in which the dye is dissolvable is irradiated with an ultraviolet ray (ultraviolet light beam) of a slightly visible long wavelength (about 315 to 400 nm) by using a blacklight or the like. If a light beam of a color different from the ultraviolet light beam emitted from the blacklight can be visually observed, that dye can be determined as a "fluorescent dye", which exhibits fluorescence. As the blacklight, a commercially available product (such as the trade name "SLUV-4" (manufactured by AS ONE Corporation) or the like) can be used.

The fluorescent dye in the resin particle dyed with it can be analyzed through the following procedure, for example. The resin particle taken out of the ink in a usual manner is dissolved in an organic solvent, such as chloroform, to thereby prepare a sample. The fluorescent dye is isolated from the prepared sample by using high-performance liquid chromatography (HPLC). The isolated dye is analyzed by common structural analysis techniques such as nuclear magnetic resonance (NMR) spectroscopy and matrix-assisted laser desorption/ionization mass spectrometry (MALDI-MS).

The basic dye is a compound that has an amino group or imino group (a salt may be formed) in its molecular structure, and exhibits fluorescence. Examples of the compound that has an amino group or imino group in its molecular structure include "dyes with the term "Basic" in their names listed in Colour Index International" and the like. Colour Index International is a database of coloring materials built by the Society of Dyers and Colourists and another organization.

Specific examples of basic dyes that exhibit fluorescence and have a xanthene skeleton include, by their C.I. numbers or common names: C.I. Basic Red 1, 1:1, 4, 8 and 11; C.I. Basic Violet 10, 11 and 11:1; Rhodamine 19 and 575; and the like. Of these, C.I. Basic Red 1 and 1:1; C.I. Basic Violet 11 and 11:1; and the like are preferable for their excellent color developability.

The content (% by mass) of the fluorescent dye in the ink is preferably 0.01% by mass or more to 5.00% by mass or less and more preferably 0.05% by mass or more to 1.00% by mass or less based on the total mass of the ink. The ratio (% by mass) of the fluorescent dye in the resin particle is preferably 1.0% by mass or more to 15.0% by mass or less and more preferably 1.0% by mass or more to 8.0% by mass or less. If the ratio of the fluorescent dye in the resin particle is less than 1.0% by mass, the color developability (chroma) of an image may slightly decrease. On the other hand, if the ratio of the fluorescent dye in the resin particle is more than 15.0% by mass, the color developability (lightness) of the image may slightly decrease due to concentration quenching.

(Quinacridone Pigment)

The ink contains a quinacridone pigment. The quinacridone pigment is a pigment made of a compound having the skeleton represented by the following formula (2) (quinacridone skeleton).

(2)

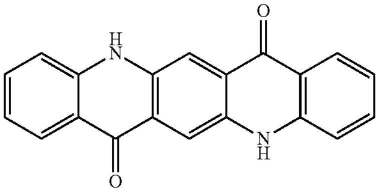

Specific examples of the quinacridone pigment include: C.I. Pigment Orange 48 and 49; C.I. Pigment Red 122, 192, 202, 206, 207 and 209; C.I. Pigment Violet 19; and the like. Also, a solid solution pigment composed of two or more kinds of quinacridone pigments may be used. A solid solution pigment is also called a mixed crystal, and is two or more kinds of pigments dissolved together so as to form a homogeneous solid phase as a whole and different from two or more kinds of pigments simply mixed together. As the quinacridone pigment, a solid solution pigment composed of two or more kinds of quinacridone pigments is preferable. The crystal lattice of a solid solution pigment has a more complicated structure than the crystal lattice of a single pigment. By using a solid solution pigment, the interaction with the fluorescent dye tends to occur multidimensionally, so that the fluorescent dye is more likely to be present around the quinacridone pigments. This can further improve the lightfastness of an image.

The form of dispersion of the pigment may be a resin-dispersed form in which the pigment is dispersed using a resin dispersant or a self-dispersing form in which an anionic group or the like is bonded to the particle surface of the pigment. Between these, the resin-dispersed form (resin-dispersed pigment), in which the pigment is dispersed using a resin dispersant, is preferable. Examples of the resin-dispersed pigment include one obtained by dispersing a resin physically adsorbed to the particle surface of the pigment, a microcapsule pigment obtained by covering at least part of the particle surface of the pigment with a resin or the like, and so on.

The content (% by mass) of the quinacridone pigment in the ink is preferably 0.01% by mass or more to 0.70% by mass or less based on the total mass of the ink. If the content of the quinacridone pigment is less than 0.01% by mass, the lightfastness of the image may slightly decrease. If, on the other hand, the content of the quinacridone pigment is more than 0.70% by mass, the color developability (lightness) of the image may slightly decrease.

The mass ratio of the content (% by mass) of the quinacridone pigment in the ink to the content (% by mass) of the fluorescent dye is 1.0 times or less. That is, in the present invention, to provide an ink with which a fluorescent color image can be recorded, the content of the fluorescent dye in the ink is set to be equal to or more than the content of the quinacridone pigment, unlike the conventional technique in which a fluorescent dye is used as an aid to improve the color developability of a pigment ink. If the above mass ratio is more than 1.0 times, the amount of the quinacridone pigment is too large as compared to the fluorescent dye, which lowers the vividness of the fluorescent color and makes the color developability (lightness) of the image insufficient. Also, the mass ratio of the content (% by mass) of the quinacridone pigment to the content (% by mass) of the fluorescent dye is preferably 0.1 times or more. If the mass ratio is less than 0.1 times, the amount of the quinacridone pigment is too small as compared to the fluorescent dye, which makes the interaction weak and may thus lower the lightfastness improving effect.

The sum of the content (% by mass) of the fluorescent dye and the content (% by mass) of the quinacridone pigment in the ink is preferably 0.10% by mass or more to 1.50% by mass or less based on the total mass of the ink. If the sum of the content of the fluorescent dye and the content of the quinacridone pigment is less than 0.10% by mass, the total amount of the coloring materials is so small that the color developability of the image may decrease. If, on the other hand, the sum of the content of the fluorescent dye and the content of the quinacridone pigment is more than 1.50% by mass, then, when the amount of the fluorescent dye is excessively large, concentration quenching is likely to occur and, when the amount of the pigment is excessively large, the lightness improving effect specific to the fluorescent dye will be weak, which may lower the color developability (lightness) of the image.

(Resin Particle)

"Resin particle" herein mean a resin that can be dispersed in an aqueous medium and present in the aqueous medium in such a state where the resin has a particle size. Thus, the resin particle is present in a state of being dispersed in the ink, i.e., in the state of a resin emulsion.

Whether a resin is "resin particle" can be determined by following the method described below. First, a liquid containing a resin neutralized with an amount of an alkali (such as sodium hydroxide or potassium hydroxide) corresponding to the acid value (resin solid content: 10% by mass) is prepared. Next, the prepared liquid is diluted 10-fold (in terms of volume) with pure water to prepare a sample solution. If a particle having a particle size is observed in a measurement of the particle size of the resin in the sample solution by dynamic light scattering, the resin can be determined as "resin particle". As a particle size distribution measurement apparatus using dynamic light scattering, a particle size analyzer (e.g., trade name "UPA-EX150", manufactured by NIKKISO CO., LTD.) or the like can be used. The conditions for this measurement can be as follows, for example: SetZero: 30 seconds, Number of times measurement is performed: 3, Measurement duration: 180 seconds, Shape: perfect sphere, Refractive index: 1.59. Needless to say, the particle size distribution measurement apparatus to be used, the measurement conditions and the like are not limited to the above. The reason for measuring the particle size using the neutralized resin is to check whether a particle is still formed even in a state where the resin is sufficiently neutralized to make it more difficult to form a particle. A resin having the shape of a particle even under such conditions will be present in the form of a particle in the aqueous ink.

The resin particle has a cyano group-containing unit. It is preferable that the resin particle further contains an anionic group-containing unit. Moreover, the resin particle is preferably a resin particle with a so-called core-shell structure, which has a core portion and a shell portion covering the core portion. The shell portion preferably contains the anionic group-containing unit. Using such a resin particle can improve the ejection stability of the ink. Also, the shell portion preferably contains no cyano group-containing unit.

The monomer that serves as the cyano group-containing unit via polymerization is preferably one having a single polymerizable functional group such as an ethylenically unsaturated bond in the molecule. Specific examples include acrylonitrile, methacrylonitrile, chloroacrylonitrile, 2-cyanoethyl (meth)acrylate and the like. The monomer that serves as the cyano group-containing unit via polymerization is preferably one having no anionic group or aromatic group and one with a molecular weight of 300 or less and is more preferably one with a molecular weight 200 or less. Of the above, acrylonitrile and methacrylonitrile are particularly preferable since their reactivity during polymerization is good and also the stability of resin particle obtained with them is excellent.

Examples of the anionic group in the anionic group-containing unit include a carboxylic acid group, a phenolic hydroxy group, a phosphate ester group and the like. Of these, a carboxylic acid group is preferable since the stability of the resin particle in the ink is good. The monomer that serves as the anionic group-containing unit via polymerization is preferably one having a single polymerizable functional group such as an ethylenically unsaturated bond in the molecule. Specific examples include (meth)acrylic acid, p-vinylbenzoic acid, 4-vinylphenol, β-carboxyethyl (meth) acrylate, (methacrylic acid-2-hydroxyethyl) phosphate, 2-hydroxyethyl (meth)acrylate, 3-hydroxypropyl (meth) acrylate and the like. The monomer that serves as the anionic group-containing unit via polymerization is preferably one having no cyano group and one with a molecular weight of 300 or less and is more preferably one with a molecular weight 200 or less. Of the above, (meth)acrylic acid is particularly preferable. Also, the anionic group in the anionic group-containing unit is preferably only a carboxylic acid group. The anionic group may be either an acid or salt type. When the anionic group is the salt type, it may be either partially dissociated or fully dissociated. Examples of cations as counterions in the case where the anionic group is the salt type include alkali metal cations, ammonium, organic ammonium and the like.

The resin particle may further contain other units such as an aliphatic group-containing unit and an aromatic group-containing unit. The monomer that serves as the aliphatic group-containing unit is preferably one having a single polymerizable functional group such as an ethylenically unsaturated bond in the molecule. In particular, an alkyl (meth)acrylate ester whose alkyl group part has 1 to 12 carbon atoms is preferable. Also, the monomer that serves as the aromatic group-containing unit is preferably one having a single polymerizable functional group such as an ethylenically unsaturated bond in the molecule. Of such substances, styrene and derivatives thereof are more preferable and styrene and vinyltoluene are particularly preferable since their reactivity during polymerization is good and the stability of resin particle obtained with them is excellent.

A crosslinking agent can be used in the manufacture of the resin particle. That is, a resin particle having a unit derived from a crosslinking agent can be used. Using a crosslinking agent makes it possible to obtain a resin particle having a core-shell structure that can suppress an excessive increase in the hydrophilicity of the shell portion and improve the sticking recovery property of the ink. Further, by using two or more kinds of crosslinking agents, it is possible to form a dense cross-linked structure that can more efficiently suppress an excessive increase in the hydrophilicity of the shell portion.

A surfactant can be used in the manufacture of the resin particle. It is preferable to manufacture the resin particle in the presence of a surfactant since doing so makes it easier for the particle size and shape of the resin particle to be stable. Note that a non-reactive surfactant may be apt to get detached from the resin particle. If the surfactant gets detached from the resin particle within the ink, it will affect physical properties of the ink such that the ejection stability and the like may be apt to decrease. Thus, as the surfactant to be used in the manufacture of the resin particle, a reactive surfactant that gets incorporated into the resin is preferable. In this way, it is possible to use a resin particle having a unit derived from a reactive surfactant.

As the reactive surfactant, it is preferable to use a compound having a polymerizable functional group such as a (meth)acryloyl group, a maleyl group, a vinyl group or an allyl group bonded to the inside or an end of a molecule including a hydrophilic moiety or a hydrophobic moiety. Examples of the hydrophilic moiety include polyoxyalkylene chains such as an ethylene oxide chain and a propylene oxide chain. Examples of the hydrophobic moiety include structures such as alkyl, aryl and a combination thereof. The hydrophilic moiety and the hydrophobic moiety may be bonded to each other via a linking group such as an ether group. The molecular weight of the reactive surfactant is preferably more than 200, more preferably more than 300, and particularly preferably 400 or more.

The mass ratio of the core portion and the shell portion (core portion: shell portion) of the resin particle having the core-shell structure is preferably 50:50 to 95:5 and more preferably 60:40 to 90:10, with the total being 100.

The content (% by mass) of the resin particle in the ink is preferably 1.00% by mass or more to 10.00% by mass or less based on the total mass of the ink. If the content of the resin particle is less than 1.00% by mass, the color developability of an image may slightly decrease. If, on the other hand, the content of the resin particle is more than 10.00% by mass, the ejection stability of the ink may slightly decrease.

The mass ratio of the content (% by mass) of the resin particle in the ink to the content (% by mass) of the quinacridone pigment is preferably 9 time or more to 100 times or less. If the mass ratio is less than 9 times, it is difficult for the resin particle dyed with the fluorescent dye to be present around the quinacridone pigment on a recording medium to which the ink is applied. This may lower the lightfastness of the image. If, on the other hand, the mass ratio is more than 100 times, the amount of the resin particle and the fluorescent dye with which it is dyed is excessively large as compared to the quinacridone pigment, and the amount of the quinacridone pigment is therefore excessively smaller. This may lower the lightfastness of the image.

The resin particle preferably has a cumulative 50% particle diameter of in the volume-based particle size distribution (D50) of 140 nm or more to 300 nm or less. If the cumulative 50% particle diameter of in the volume-based particle size distribution is less than 140 nm, the resin particle is apt to partly sink in a recording medium in its thickness direction, which reduces the amount of the fluorescent dye present around the quinacridone pigment and may lower the lightfastness of the image. If, on the other hand, the cumulative 50% particle diameter in the volume-based particle size distribution is more than 300 nm, the ejection stability of the ink may decrease.

[Method of Manufacturing Dyed Resin Particle]

The resin particle can be manufactured by a conventional, publicly known method such as emulsion polymerization, mini-emulsion polymerization, seed polymerization or phase inversion emulsification, for example. Examples of the method of dyeing the resin particle include: a method in which the resin particle is formed by polymerization of a monomer mixed liquid in which the fluorescent dye is dissolved; a method in which the fluorescent dye is added to the resin particle and heated; and the like. Of these, the method in which the fluorescent dye is added to the resin particle and heated is preferable since it is applicable to more kinds of fluorescent dyes.

[Method of Verifying Resin Particle]

The composition of the resin particle can be verified by the method described in (i) to (iii) below. While the following will describe a method in which the resin particle is extracted from the ink and analyzed and verified, a resin particle extracted from an aqueous dispersion liquid can also be analyzed and verified similarly.

(i) Extraction of Resin Particle

From the ink containing the resin particle, the resin particle can be separated and extracted by a density gradient centrifugation method. Of the density gradient centrifugation methods, a density gradient sedimentation velocity method involves separating and extracting the resin particle based on the difference in sedimentation coefficient between components. Of the density gradient centrifugation methods, a density gradient sedimentation equilibrium method involves separating and extracting the resin particle based on the difference in density between components.

(ii) Checking and Separation of Layer Structure

Firstly, the resin particle is dyed with ruthenium tetroxide and fixed and then the resin particle is then buried in an epoxy resin to be stably held. Then, the resin particle buried in the epoxy resin is cut using an ultramicrotome, and the cross-section is observed using a scanning transmission electron microscope (STEM). By observing a cross section obtained by cutting an individual particle of the resin particle through its center of gravity, it is possible to check the layer structure of the resin particle. With the resin particle buried in the epoxy resin as an analysis sample, the elements contained in the constituent layers of the resin particle (core portion and shell portion) can be quantitatively analyzed with a STEM-EDX also capable of energy-dispersive X-ray spectroscopy (EDX).

(iii) Analysis of Constituent Unit (Monomer) of Each Resin Layer

The resin particle as a sample whose resin layers are to be separated may be in the state of a dispersion liquid. Alternatively, the resin particle dried and formed into a film may be used as a sample. The resin particle as a sample may be dissolved in an organic solvent, and then its layers may be separated by gel permeation chromatography (GPC) to obtain the constituent resin of each layer. Thereafter, the resins thus separated are subjected to an elemental analysis by a combustion method. Apart from this, the separated resins are pretreated by an acid decomposition (hydrofluoric acid addition) method or an alkali fusion method, and then inorganic components are quantitatively analyzed by inductively coupled plasma emission spectroscopy. It is possible to figure out the resin particle's layers formed by the separated resins by comparing the results of the elemental analysis and the quantitatively analysis of the inorganic components and the result of the quantitative analysis of the elements by the STEM-EDX obtained in (ii) described above.

Moreover, the separated resins are analyzed by nuclear magnetic resonance (NMR) spectroscopy and matrix-assisted laser desorption/ionization mass spectrometry (MALDI-MS). In this way, it is possible to figure out the kinds and ratios of the constituent units (monomers) and the cross-linkable components of the resins. Furthermore, by analyzing the separated resins by pyrolysis gas chromatography, it is possible to directly detect monomers generated as a result of depolymerization.

(Aqueous Medium)

The ink is an aqueous ink containing at least water as an aqueous medium. The ink can contain a water-soluble organic solvent as an aqueous medium. As the water, deionized water or ion-exchanged water is preferably used. The content (% by mass) of the water in the ink is preferably 50.00% by mass or more to 95.00% by mass or less based on the total mass of the ink. Also, as the water-soluble organic solvent, any of those commonly used in inks can be used. Examples include alcohols, (poly)alkylene glycols, glycol ethers, nitrogen-containing compounds, sulfur-containing compounds and the like. The content (% by mass) of the water-soluble organic solvent in the ink is preferably 3.00% by mass or more to 50.00% by mass or less based on the total mass of the ink.

(Other Additives)

Besides the components described above, the ink may contain a water-soluble organic compound that is solid at normal temperature including polyalcohols such as trimethylolpropane and trimethylolethane, urea and a urea derivative such as ethylene urea as appropriate. Further, the ink may contain various additives such as a water-soluble resin, undyed resin particle, surfactant, pH adjuster, corrosion inhibitor, preservative, mildewproofing agent, antioxidant, reduction inhibitor, evaporation accelerator, chelator and other resins. While the ink can contain coloring materials such as dyes (including dyes that do not exhibit fluorescence and dyes that exhibit fluorescence other than basic dyes) and pigments other than quinacridone pigments, the ink does not usually have to contain coloring materials as above. Also, in the case of using a resin (water-soluble resin, resin particle), it is preferable to use an acrylic resin and not to use a urethane resin.

(Physical Properties of Ink)

Since the ink is an aqueous ink to be used for the ink jet type, it is preferable to appropriately control its physical property values. Specifically, the surface tension of the ink at 25° C. measured by the plate method is preferably 20 mN/m or more to 60 mN/m or less and more preferably 25 mN/m or more to 45 mN/m or less. Also, the viscosity of the ink at 25° C. is preferably 1.0 mPa·s or more to 10.0 mPa·s or less and more preferably 1.0 mPa·s or more to 5.0 mPa·s or less. Moreover, the pH of the ink at 25° C. is preferably 7.0 or more to 10.0 or less.

<Ink Cartridge>

An ink cartridge of the present invention includes an ink and an ink storage portion that stores this ink. Moreover, the ink stored in this ink storage portion is the aqueous ink of the present invention described above. FIG. 1 is a cross-sectional view schematically illustrating one embodiment of the ink cartridge of the present invention. As illustrated in FIG. 1, at the bottom surface of the ink cartridge, there is provided an ink supply port 12 for supplying the ink to a recording head. The inside of the ink cartridge is an ink storage portion for storing the ink. The ink storage portion includes an ink storage chamber 14 and an absorber storage chamber 16, which communicate with each other through a communication port 18. The absorber storage chamber 16 also communicates with the ink supply port 12. The ink storage chamber 14 stores a liquid ink 20, and the absorber storage chamber 16 stores absorbers 22 and 24 that hold the ink in an immersed state. The configuration of the ink storage portion may be such that it has no ink storage chamber for storing the liquid ink and holds the entire amount of the ink to be stored by means of the absorbers. Alternatively, the configuration of the ink storage portion may be such that it has no absorber and stores the entire amount of the ink in the form of liquid. Still alternatively, an ink cartridge with a configuration in which it has an ink storage portion and a recording head may be employed.

<Ink Jet Recording Method>

The ink jet recording method of the present invention is a method of recording an image onto a recording medium by ejecting the aqueous ink of the present invention described above from an ink jet recording head. Examples of the ink ejection method include a method involving applying mechanical energy to the ink and a method involving applying thermal energy to the ink. In the present invention, it is particularly preferable to employ the method involving applying thermal energy to the ink. Besides using the ink of the present invention, the steps in the ink jet recording method may be publicly known steps.

Figure 2A:
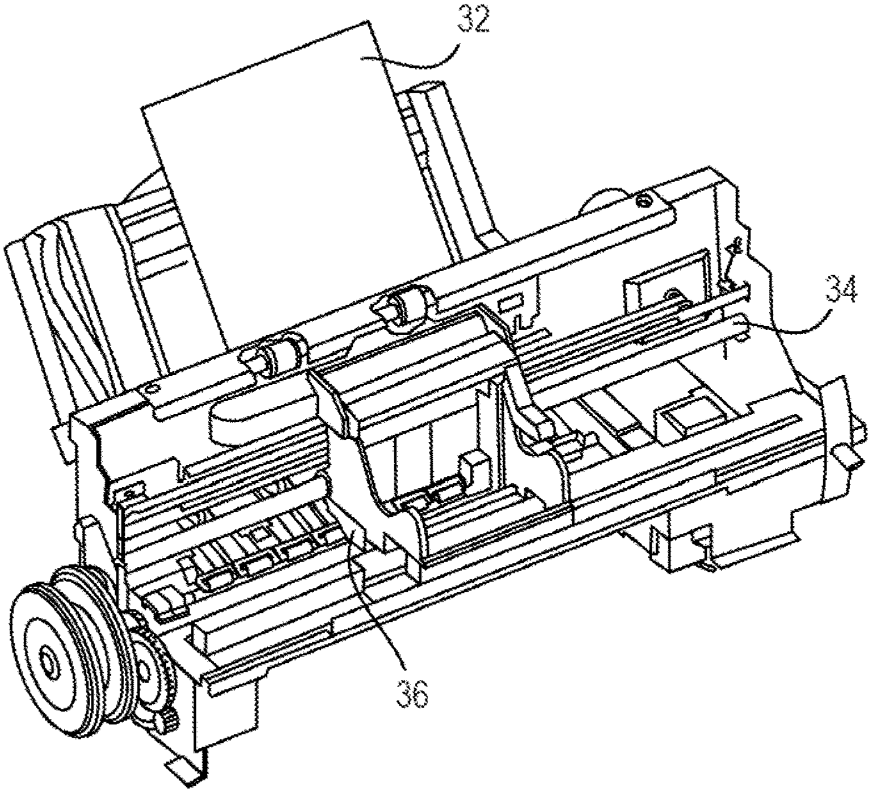
FIGS. 2A and 2B are views schematically illustrating one example of an ink jet recording apparatus for use in an ink jet recording method of the present invention.
Figure 2B:
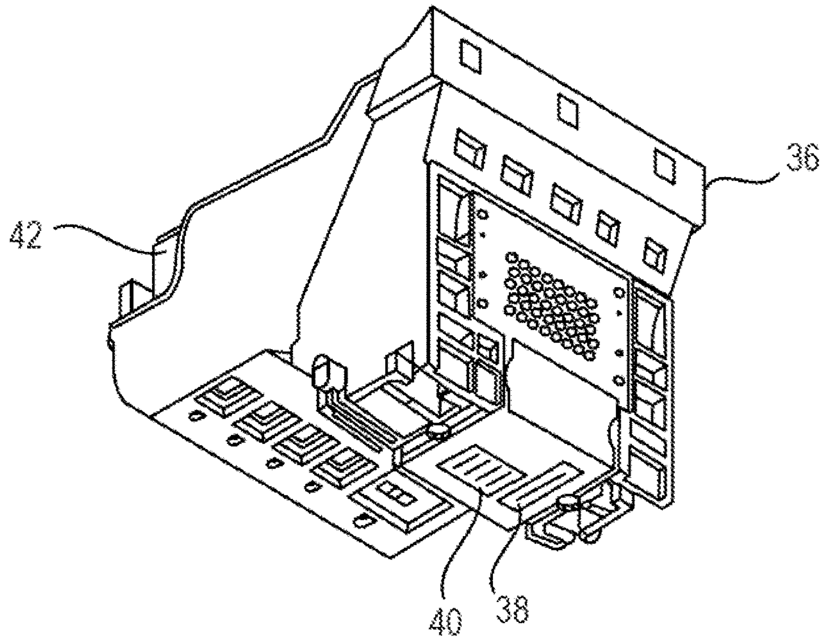

FIGS. 2A and 2B are views schematically illustrating one example of an ink jet recording apparatus for use in the ink jet recording method of the present invention. FIG. 2A is a perspective view of a main part of the ink jet recording apparatus, and FIG. 2B is a perspective view of a head cartridge. The ink jet recording apparatus is provided with a conveyance unit (not illustrated) that conveys a recording medium 32 and a carriage shaft 34. A head cartridge 36 can be mounted on the carriage shaft 34. The head cartridge 36 includes recording heads 38 and 40 and is configured such that an ink cartridge 42 can be set thereon. While the head cartridge 36 is conveyed in the main scanning direction along the carriage shaft 34, the ink (not illustrated) is ejected from the recording heads 38 and 40 toward the recording medium 32. Moreover, the recording medium 32 is conveyed in the sub scanning direction by the conveyance unit (not illustrated). As a result, an image is recorded onto the recording medium 32. Although the recording medium 32 is not particularly limited, it is preferable to use a paper-based recording medium such as a recording medium with no coating layer, such as plain paper, or a recording medium with a coating layer, such as glossy paper or matt paper. This recording medium does not need to be for transfer.

EXAMPLES

Hereinafter, the present invention will be described in more detail based on Examples and Comparative Examples. However, the present invention is by no means limited to the following Examples as long as the gist thereof is not exceeded. The amounts of components represented by "part (s)" and "%" are based on mass, unless otherwise noted.

<Preparation of Aqueous Dispersion Liquid of Resin Particle>

A reaction container equipped with an agitation device was set in a hot water bath. 1,178 parts of water was put in the reaction container, and the internal temperature was held at 70° C. Monomers shown in Table 1 were mixed in the corresponding amounts (parts) to be loaded and proportions (%) shown in Table 1. As a result, a monomer mixed liquid for a core portion was prepared. Also, 1.9 parts of potassium persulfate and 659 parts of water were mixed to prepare a polymerization initiator aqueous solution 1. The monomer mixed liquid for the core portion and the polymerization initiator aqueous solution 1 were simultaneously dripped into the reaction container within a period of 60 minutes. The dripping was followed by continuous agitation for a further reaction for 30 minutes, so that a particle as the core portion of a resin particle was synthetized.

Next, monomers shown in Table 1 were mixed in the corresponding amounts (parts) to be loaded and proportions (%) shown in Table 1 to prepare a monomer mixed liquid for a shell portion. Also, 0.1 parts of potassium persulfate and 133 parts of water were mixed to prepare a polymerization initiator aqueous solution 2. The internal temperature of the reaction container with the particle as the core portion therein was held at 80° C., and the monomer mixed liquid for the shell portion and the polymerization initiator aqueous solution 2 were simultaneously dripped within a period of 10 minutes. The dripping was followed by agitation for 120 minutes to continue the reaction, so that the shell portion was synthesized. As a result, a resin particle having a core-shell structure in which the particle as the core portion is covered with the resin as the shell portion. Note that, for a resin particle 5, no shell portion was synthesized. Also, for resin particle 6, a crosslinking agent to be a crosslinking agent unit was added.

Thereafter, an 8 mol/L potassium hydroxide aqueous solution was added in an appropriate amount into the reaction container to adjust the pH of the liquid to 8.5. Further, powder of a fluorescent dye was added in the corresponding amount to be loaded (parts) shown in Table 1, followed by heating to 80° C. Thereafter, agitation was performed for two hours to dye the resin particle with the fluorescent dye. Next, an 8 mol/L potassium hydroxide aqueous solution was added in an appropriate amount into the reaction container to adjust the pH of the liquid to 8.5. Water was further added in an appropriate amount. As a result, each resin particle's aqueous dispersion liquid having a resin particle content of 20% was obtained. Note that, a resin particle 19 was not dyed with a dye. The particle size of each resin particle (the cumulative 50% particle diameter of in the volume-based particle size distribution) is shown in Table 1. The particle size of the resin particle was measured using a dynamic light scattering particle size analyzer (trade name "UPA-EX150", manufactured by NIKKISO CO., LTD) under following conditions:

SetZero: 30 seconds
Number of times measurement was performed: 3
Measurement duration: 180 seconds
Shape: perfect sphere
Refractive index: 1.59.

The abbreviations in Table 1 mean as follows.

St: styrene
AN: acrylonitrile
MAN: methacrylonitrile
EMA: ethyl methacrylate
AA: acrylic acid
MAA: methacrylic acid
EDMA: ethylene glycol dimethacrylate
EX-810: ethylene glycol diglycidyl ether (trade name "DENACOL EX-810", manufactured by Nagase ChemteX Corporation)
BR1: C.I. Basic Red 1
BR1:1: C.I. Basic Red 1:1
BV11: C.I. Basic Violet 11
BV11:1: C.I. Basic Violet 11:1
SR49: C.I. Solvent Red 49

TABLE 1

Preparation Conditions and Properties of Resin Particles

| | Core Portion | | | | | | | Shell Portion | | | | | Fluorescent Dye | | | | | | Properties |
|---|---|---|---|---|---|---|---|---|---|---|---|---|---|---|---|---|---|---|---|
| | | Proportions of Loaded Monomers (%) | | | | | | | Proportions of Loaded Monomers (%) | | Crosslinking Unit | | Parts of Loaded Amounts | | | | | Ratio in Resin Particle | |
| Resin Particle | Loaded Monomers (Parts) | St | AN | MAN | EMA | AA | MAA | Loaded Monomers (Parts) | St | MAA | EDMA | EX-810 | BR 1 | BV 11:1 | BR 1:1 | BV 11 | SR 49 | (%) | Particle Diameter (nm) |
| 1 | 466 | 50 | 47 | | | | 3 | 80 | 85 | 15 | | | 29 | | | | | 5.0 | 200 |
| 2 | 466 | 50 | 47 | | | | 3 | 80 | 85 | 15 | | | | 29 | | | | 5.0 | 200 |
| 3 | 466 | 50 | 47 | | | | 3 | 80 | 85 | 15 | | | | | 29 | | | 5.0 | 200 |
| 4 | 466 | 50 | 47 | | | | 3 | 80 | 85 | 15 | | | | | | 29 | | 5.0 | 200 |
| 5 | 546 | 50 | 47 | | | | 3 | | | | | | 29 | | | | | 5.0 | 200 |
| 6 | 466 | 50 | 47 | | | | 3 | 80 | 20 | 15 | 40 | 25 | 29 | | | | | 5.0 | 200 |
| 7 | 466 | 50 | | 47 | | | 3 | 80 | 85 | 15 | | | 29 | | | | | 5.0 | 200 |
| 8 | 466 | 50 | 47 | | | 3 | | 80 | 85 | 15 | | | 29 | | | | | 5.0 | 200 |
| 9 | 466 | | 47 | | 50 | | 3 | 80 | 85 | 15 | | | 29 | | | | | 5.0 | 200 |
| 10 | 466 | 50 | 47 | | | | 3 | 80 | 85 | 15 | | | 6 | | | | | 1.0 | 200 |
| 11 | 466 | 50 | 47 | | | | 3 | 80 | 85 | 15 | | | 96 | | | | | 15.0 | 200 |
| 12 | 466 | 50 | 47 | | | | 3 | 80 | 85 | 15 | | | 29 | | | | | 5.0 | 135 |
| 13 | 466 | 50 | 47 | | | | 3 | 80 | 85 | 15 | | | 29 | | | | | 5.0 | 140 |
| 14 | 466 | 50 | 47 | | | | 3 | 80 | 85 | 15 | | | 29 | | | | | 5.0 | 300 |
| 15 | 466 | 50 | 47 | | | | 3 | 80 | 85 | 15 | | | 29 | | | | | 5.0 | 305 |
| 16 | 466 | 50 | 47 | | | | 3 | 80 | 85 | 15 | | | 44 | | | | | 7.5 | 200 |
| 17 | 466 | 50 | | | 47 | | 3 | 80 | 85 | 15 | | | 29 | | | | | 5.0 | 200 |
| 18 | 466 | 50 | 47 | | | | 3 | 80 | 85 | 15 | | | | | | | 29 | 5.0 | 200 |
| 19 | 466 | 50 | 47 | | | | 3 | 80 | 85 | 15 | | | | | | | | 0.0 | 200 |

<Preparation of Pigment Dispersion Liquid>

Pigment dispersion liquids 1 to 6 were prepared. As a resin dispersant, a resin aqueous solution was used which was obtained by neutralizing a styrene-acrylic acid random copolymer having an acid value of 120 mgKOH/g and a weight average molecular weight of 10,000 with a 10% aqueous solution of potassium hydroxide having an equal molar amount to the acid value. In each pigment dispersion liquid, the content of the pigment was 20.0%, and the content of the resin was 6.0%.

(Pigment Dispersion Liquid 1)

20.0 parts of a pigment, 30.0 parts of a resin dispersant and 50.0 parts of water were mixed, followed by dispersion for one hour with a sand grinder and then centrifugation to remove undispersed materials including coarse particles. As the pigment, a solid solution of C.I. Pigment Red 202 and C.I. Pigment Violet 19 (trade name "Cromophtal Jet Magenta 2BC", manufactured by BASF). Next, the resultant product was filtered under pressure through a microfilter with a pore size of 3.0 μm (manufactured by FUJIFILM Corporation). As a result, a pigment dispersion liquid 1 was prepared.

(Pigment Dispersion Liquid 2)

A pigment dispersion liquid 2 was obtained similarly to how the pigment dispersion liquid 1 was prepared except that its pigment was changed to a solid solution of C.I. Pigment Red 122 and C.I. Pigment Violet 19 (trade name "FASTGEN SUPER MAGENTA RY", manufactured by DIC Corporation).

(Pigment Dispersion Liquid 3)

A pigment dispersion liquid 3 was obtained similarly to how the pigment dispersion liquid 1 was prepared except that its pigment was changed to C.I. Pigment Red 122 (trade name "PV Fast Pink E", manufactured by Clariant AG).

(Pigment Dispersion Liquid 4)

A pigment dispersion liquid 4 was obtained similarly to how the pigment dispersion liquid 1 was prepared except that its pigment was changed to C.I. Pigment Violet 19 (trade name "Ink Jet Magenta E5B02", manufactured by Clariant AG).

(Pigment Dispersion Liquid 5)

A pigment dispersion liquid 5 was obtained similarly to how the pigment dispersion liquid 1 was prepared except that its pigment was changed to C.I. Pigment Red 41 (trade name "SUIMEI Dianisidine Red R", Sansui Shikiso Kogyo K.K.), which was an azo pigment.

(Pigment Dispersion Liquid 6)

A pigment dispersion liquid 6 was obtained similarly to how the pigment dispersion liquid 1 was prepared except that its pigment was changed to C.I. Pigment Red 254 (trade name "Cromophtal DPP Red BP", manufactured by BASF), which was a diketopyrrolopyrrole pigment.

Preparation of Ink

Examples 1 to 29 and Comparative Examples 1 to 7

Inks were each prepared by mixing the components (unit: %) shown in an upper part of Table 2 (i.e. Tables 2-1 to 2-4), sufficiently agitating the mixture and then filtering it under pressure through a microfilter with a pore size of 3.0 μm (manufactured by FUJIFILM Corporation). In Table 2, "ACETYLENOL E100" is the trade name of a nonionic surfactant manufactured by Kawaken Fine Chemicals Co., Ltd. In a lower part of Table 2, properties of the inks are shown, including Comparative Example 8 to be described next. The pH of each ink prepared was within the range of 8.5 to 9.0.

TABLE 2-1

Compositions and Properties of Inks

| | Examples | | | | | | | | | |
|---|---|---|---|---|---|---|---|---|---|---|
| | 1 | 2 | 3 | 4 | 5 | 6 | 7 | 8 | 9 | 10 |
| Resin Particle No. | 1 | 2 | 3 | 4 | 5 | 6 | 7 | 8 | 9 | 1 |
| Pigment Dispersion Liquid No. | 1 | 1 | 1 | 1 | 1 | 1 | 1 | 1 | 1 | 2 |
| Aqueous Dispersion Liquid of Resin Particle | 25.00 | 25.00 | 25.00 | 25.00 | 25.00 | 25.00 | 25.00 | 25.00 | 25.00 | 25.00 |
| Pigment Dispersion Liquid | 1.00 | 1.00 | 1.00 | 1.00 | 1.00 | 1.00 | 1.00 | 1.00 | 1.00 | 1.00 |
| C.I. Basic Red 1 | | | | | | | | | | |
| Glycerin | 10.00 | 10.00 | 10.00 | 10.00 | 10.00 | 10.00 | 10.00 | 10.00 | 10.00 | 10.00 |
| Triethylene Glycol | 10.00 | 10.00 | 10.00 | 10.00 | 10.00 | 10.00 | 10.00 | 10.00 | 10.00 | 10.00 |
| ACETYLENOL E100 | 1.00 | 1.00 | 1.00 | 1.00 | 1.00 | 1.00 | 1.00 | 1.00 | 1.00 | 1.00 |
| Pure Water | 53.00 | 53.00 | 53.00 | 53.00 | 53.00 | 53.00 | 53.00 | 53.00 | 53.00 | 53.00 |
| Content R (%) of Resin Particle | 5.00 | 5.00 | 5.00 | 5.00 | 5.00 | 5.00 | 5.00 | 5.00 | 5.00 | 5.00 |
| Content F (%) of Fluorescent Dye | 0.25 | 0.25 | 0.25 | 0.25 | 0.25 | 0.25 | 0.25 | 0.25 | 0.25 | 0.25 |
| Content P (%) of Pigment | 0.20 | 0.20 | 0.20 | 0.20 | 0.20 | 0.20 | 0.20 | 0.20 | 0.20 | 0.20 |
| P/F (times) | 0.8 | 0.8 | 0.8 | 0.8 | 0.8 | 0.8 | 0.8 | 0.8 | 0.8 | 0.8 |
| F + P (%) | 0.45 | 0.45 | 0.45 | 0.45 | 0.45 | 0.45 | 0.45 | 0.45 | 0.45 | 0.45 |
| R/P (times) | 25 | 25 | 25 | 25 | 25 | 25 | 25 | 25 | 25 | 25 |

TABLE 2-2

Compositions and Properties of Inks

| | Examples | | | | | | | | | |
|---|---|---|---|---|---|---|---|---|---|---|
| | 11 | 12 | 13 | 14 | 15 | 16 | 17 | 18 | 19 | 20 |
| Resin Particle No. | 10 | 10 | 11 | 11 | 11 | 11 | 10 | 12 | 13 | 14 |
| Pigment Dispersion Liquid No. | 1 | 1 | 1 | 1 | 1 | 1 | 1 | 1 | 1 | 1 |

TABLE 2-2-continued

Compositions and Properties of Inks

| | Examples | | | | | | | | | |
|---|---|---|---|---|---|---|---|---|---|---|
| | 11 | 12 | 13 | 14 | 15 | 16 | 17 | 18 | 19 | 20 |
| Aqueous Dispersion Liquid of Resin Particle | 20.00 | 25.00 | 30.00 | 30.50 | 10.80 | 10.80 | 25.25 | 25.00 | 25.00 | 25.00 |
| Pigment Dispersion Liquid | 0.20 | 0.25 | 3.00 | 3.00 | 1.30 | 1.20 | 0.25 | 1.00 | 1.00 | 1.00 |
| C.I. Basic Red 1 | | | | | | | | | | |
| Glycerin | 10.00 | 10.00 | 10.00 | 10.00 | 10.00 | 10.00 | 10.00 | 10.00 | 10.00 | 10.00 |
| Triethylene Glycol | 10.00 | 10.00 | 10.00 | 10.00 | 10.00 | 10.00 | 10.00 | 10.00 | 10.00 | 10.00 |
| ACETYLENOL E100 | 1.00 | 1.00 | 1.00 | 1.00 | 1.00 | 1.00 | 1.00 | 1.00 | 1.00 | 1.00 |
| Pure Water | 58.80 | 53.75 | 46.00 | 45.50 | 66.90 | 67.00 | 53.50 | 53.00 | 53.00 | 53.00 |
| Content R (%) of Resin Particle | 4.00 | 5.00 | 6.00 | 6.10 | 2.16 | 2.16 | 5.05 | 5.00 | 5.00 | 5.00 |
| Content F (%) of Fluorescent Dye | 0.04 | 0.05 | 0.90 | 0.92 | 0.32 | 0.32 | 0.05 | 0.25 | 0.25 | 0.25 |
| Content P (%) of Pigment | 0.04 | 0.05 | 0.60 | 0.60 | 0.26 | 0.24 | 0.05 | 0.20 | 0.20 | 0.20 |
| P/F (times) | 1.0 | 1.0 | 0.7 | 0.7 | 0.8 | 0.8 | 1.0 | 0.8 | 0.8 | 0.8 |
| F + P (%) | 0.08 | 0.10 | 1.50 | 1.52 | 0.58 | 0.56 | 0.10 | 0.45 | 0.45 | 0.45 |
| R/P (times) | 100 | 100 | 10 | 10 | 8 | 9 | 101 | 25 | 25 | 25 |

TABLE 2-3

Compositions and Properties of Inks

| | Examples | | | | | | | | |
|---|---|---|---|---|---|---|---|---|---|
| | 21 | 22 | 23 | 24 | 25 | 26 | 27 | 28 | 29 |
| Resin Particle No. | 15 | 1 | 1 | 11 | 11 | 16 | 16 | 11 | 11 |
| Pigment Dispersion Liquid No. | 1 | 3 | 4 | 1 | 1 | 1 | 1 | 1 | 1 |
| Aqueous Dispersion Liquid of Resin Particle | 25.00 | 25.00 | 25.00 | 3.10 | 3.20 | 50.00 | 50.00 | 3.33 | 3.50 |
| Pigment Dispersion Liquid | 1.00 | 1.00 | 1.00 | 0.04 | 0.05 | 3.50 | 3.60 | 0.05 | 0.05 |
| C.I. Basic Red 1 | | | | | | | | | |
| Glycerin | 10.00 | 10.00 | 10.00 | 10.00 | 10.00 | 10.00 | 10.00 | 10.00 | 10.00 |
| Triethylene Glycol | 10.00 | 10.00 | 10.00 | 10.00 | 10.00 | 10.00 | 10.00 | 10.00 | 10.00 |
| ACETYLENOL E100 | 1.00 | 1.00 | 1.00 | 1.00 | 1.00 | 1.00 | 1.00 | 1.00 | 1.00 |
| Pure Water | 53.00 | 53.00 | 53.00 | 75.86 | 75.75 | 25.50 | 25.40 | 75.62 | 75.45 |
| Content R (%) of Resin Particle | 5.00 | 5.00 | 5.00 | 0.62 | 0.64 | 10.00 | 10.00 | 0.70 | 0.67 |
| Content F (%) of Fluorescent Dye | 0.25 | 0.25 | 0.25 | 0.093 | 0.096 | 0.75 | 0.75 | 0.11 | 0.10 |
| Content P (%) of Pigment | 0.20 | 0.20 | 0.20 | 0.008 | 0.010 | 0.70 | 0.72 | 0.01 | 0.01 |
| P/F (times) | 0.8 | 0.8 | 0.8 | 0.1 | 0.1 | 0.9 | 1.0 | 0.09 | 0.10 |
| F + P (%) | 0.45 | 0.45 | 0.45 | 0.10 | 0.11 | 1.45 | 1.47 | 0.12 | 0.11 |
| R/P (times) | 25 | 25 | 25 | 78 | 64 | 14 | 14 | 70 | 67 |

TABLE 2-4

Compositions and Properties of Inks

| | Comparative Examples | | | | | | | |
|---|---|---|---|---|---|---|---|---|
| | 1 | 2 | 3 | 4 | 5 | 6 | 7 | 8 |
| Resin Particle No. | 17 | 18 | 19 | 1 | 1 | 1 | 1 | — |
| Pigment Dispersion Liquid No. | 1 | 1 | 1 | — | 5 | 6 | 1 | — |
| Aqueous Dispersion Liquid of Resin Particle | 25.00 | 25.00 | 25.00 | 25.00 | 25.00 | 25.00 | 25.00 | |
| Pigment Dispersion Liquid | 1.00 | 1.00 | 1.00 | | 1.00 | 1.00 | 1.50 | |
| C.I. Basic Red 1 | | | 0.250 | | | | | |

TABLE 2-4-continued

| Compositions and Properties of Inks | Comparative Examples | | | | | | | |
|---|---|---|---|---|---|---|---|---|
| | 1 | 2 | 3 | 4 | 5 | 6 | 7 | 8 |
| Glycerin | 10.00 | 10.00 | 10.00 | 10.00 | 10.00 | 10.00 | 10.00 | |
| Triethylene Glycol | 10.00 | 10.00 | 10.00 | 10.00 | 10.00 | 10.00 | 10.00 | |
| ACETYLENOL E100 | 1.00 | 1.00 | 1.00 | 1.00 | 1.00 | 1.00 | 1.00 | |
| Pure Water | 53.00 | 53.00 | 52.75 | 53.00 | 53.00 | 54.00 | 52.50 | |
| Content R (%) of Resin Particle | 5.00 | 5.00 | 5.00 | 5.00 | 5.00 | 5.00 | 5.00 | 12.00 |
| Content F (%) of Fluorescent Dye | 0.25 | 0.25 | 0.25 | 0.25 | 0.25 | 0.25 | 0.25 | 0.09 |
| Content P (%) of Pigment | 0.20 | 0.20 | 0.20 | 0.00 | 0.20 | 0.20 | 0.30 | 5.00 |
| P/F (times) | 0.8 | 0.8 | 0.8 | 0.0 | 0.8 | 0.8 | 1.2 | 55.6 |
| F + P (%) | 0.45 | 0.45 | 0.45 | 0.25 | 0.45 | 0.45 | 0.55 | 5.09 |
| R/P (times) | 25 | 25 | 25 | — | 25 | 25 | 17 | 2 |

Comparative Example 8

By following the description of "Example 1" in Japanese Patent Application Laid-Open No. 2009-161688, the ink of Comparative Example 8 containing the resin particle described below and a pigment (C.I. Pigment Red 122) was prepared. This resin particle is a single-layer resin particle made of units derived from acrylonitrile, styrene and acrylic acid, and is dyed with basic dyes (two kinds of fluorescent dyes) having a xanthene skeleton. The two kinds of fluorescent dyes are C.I. Basic Violet 11:1 and C.I. Basic Red 1 at a ratio of 0.3:2.0 (mass ratio).

<Evaluation>

Each ink prepared was filled in an ink cartridge, which was then set in an ink jet recording apparatus (trade name "PIXUS Pro-10", manufactured by Canon Inc.) equipped with a recording head for ejecting an ink with thermal energy. With this ink jet recording apparatus, a recording duty of 100% is defined as when an image recorded by applying eight droplets of the ink measuring 3.8 ng±10% in weight to a 1/600 inch×1/600 inch unit region. As for the recording environment, the temperature was 25° C. and the relative humidity was 55%. In the present invention, the evaluation criteria of each item below are such that "A" and "B" are acceptable levels and "C" is an unacceptable level. Table 3 shows the evaluation results.

(Color Developability)

Using the above-mentioned ink jet recording apparatus, an image with a gradation pattern including a plurality of solid images differing in the amount of the ink applied was recorded on a recording medium (glossy paper, trade name "Photo Paper Pro Luster", manufactured by Canon Inc.). The gradation pattern was formed of a plurality of 2 cm×2 cm solid images recorded with the amount of the ink to be applied changed stepwise, under the condition of applying at most six droplets of the ink to a 1/600 inch×1/600 inch unit region. The recorded image was dried for a day, followed by measurement of the hue angle (H(°)), the chroma (C*) and the lightness (L*) in the Lab color system and the fluorescence intensity (the highest reflected light intensity in a wavelength range of 400 to 700 nm). For the color measurement, the M1 light source of a spectrophotometer (trade name "X-Rite eXact", manufactured by X-Rite, Incorporated) was used. Moreover, the color developability of the image was evaluated based on the following evaluation criteria. The lightness was evaluated based on the value at a chroma of 50. However, when the highest chroma was below 50, data obtained by the color measurement of the plurality of solid images forming the gradation pattern was extrapolated, and the calculated lightness value thus obtained was evaluated. The evaluation criteria vary depending on the hue angle since a preferable color tone to be visually sensed varies depending on the type of color. With a fluorescent color image, the intensity of light reflected thereon is higher than that incident thereon. Thus, whether a recorded image exhibits fluorescence can be determined by checking whether the highest reflected light intensity is 100% or more or not.

[when Hue Angle was 0° or More to Less than 180° ]

A: The highest reflected light intensity was 100% or more, and the highest chroma was 70 or more and the lightness was 80 or more, or the highest chroma was 65 or more and the lightness was 85 or more.

B: The highest reflected light intensity was 100% or more, and the highest chroma was 65 or more to less than 70 and the lightness was 80 or more to less than 85.

C: At least one of the following conditions was satisfied; the highest reflected light intensity was less than 100%, the highest chroma was less than 65, or the lightness was less than 80.

[when Hue Angle was 180° or More to Less than 360°]

A: The highest reflected light intensity was 100% or more, and the highest chroma was 70 or more and the lightness was 70 or more, or the highest chroma was 65 or more and the lightness was 75 or more.

B: The highest reflected light intensity was 100% or more, and the highest chroma was 65 or more to less than 70 and the lightness was 70 or more to less than 75.

C: At least one of the following conditions was satisfied; the highest reflected light intensity was less than 100%, the highest chroma was less than 65, or the lightness was less than 70.

(Lightfastness)

Using the above-mentioned ink jet recording apparatus, a 2 cm×2 cm solid image was recorded at a recording duty of 100% on each of two recording media (glossy paper, trade name "Photo Paper Pro Luster", manufactured by Canon Inc.). One of the recorded solid images was placed in a xenon tester (trade name "Atlas Weather-Ometer Ci4000", manufactured by Toyo Seiki Seisaku-sho, Ltd.), and the solid image was irradiated with a xenon light beam for 18 hours under conditions of a temperature of 30° C., a relative humidity of 40% and an irradiation intensity of 1.25 W/m$^2$. Thereafter, the optical density (OD) of the solid image irradiated with the xenon light beam and the optical density ($OD_{Ini}$) of the solid image not irradiated with the xenon light beam were measured with the same spectrophotometer as described above. Then, the ratio of the remaining optical density was calculated based on the equation "Ratio of Remaining Optical Density (%)=(OD/$OD_{Ini}$)×100(%)", and the lightfastness of the image was evaluated based on the following evaluation criteria.

A: The ratio of the remaining optical density was 90% or more.

B: The ratio of the remaining optical density was 80% or more to less than 90%.

C: The ratio of the remaining optical density was less than 80%.

TABLE 3

| | | Evaluation Results | |
|---|---|---|---|
| | | Color Developability | Lightfastness |
| Examples | 1 | A | A |
| | 2 | A | A |
| | 3 | A | A |
| | 4 | A | A |
| | 5 | A | A |
| | 6 | A | A |
| | 7 | A | A |
| | 8 | A | A |
| | 9 | A | A |
| | 10 | A | A |
| | 11 | B | A |
| | 12 | A | A |
| | 13 | A | A |
| | 14 | B | A |
| | 15 | A | B |
| | 16 | A | A |
| | 17 | A | B |
| | 18 | A | B |
| | 19 | A | A |
| | 20 | A | A |
| | 21 | A | A |
| | 22 | A | B |
| | 23 | A | B |
| | 24 | A | B |
| | 25 | A | A |
| | 26 | A | A |
| | 27 | B | A |
| | 28 | A | B |
| | 29 | A | A |
| Comparative Examples | 1 | C | A |
| | 2 | C | A |
| | 3 | C | C |
| | 4 | A | C |
| | 5 | A | C |
| | 6 | A | C |
| | 7 | C | A |
| | 8 | C | C |

The ink in Example 21 could not be ejected stably, so that there was non-ejection at some parts of the solid image for evaluating the color developability and lightfastness.

As described above, according to the present invention, it is possible to provide an aqueous fluorescent ink with which a fluorescent color image having an excellent color developability and lightfastness can be recorded. Also, according to the present invention, it is to provide an ink cartridge and an ink jet recording method using this aqueous fluorescent ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073121, filed Apr. 23, 2021, and Japanese Patent Application No. 2022-038203, filed Mar. 11, 2022, which are hereby incorporated by reference herein in their entirety.

What is claimed is:

1. An aqueous fluorescent ink for ink jet comprising a resin particle dyed with a fluorescent dye, and a quinacridone pigment, wherein the fluorescent dye comprises a basic dye having a xanthene skeleton, wherein the resin particle has a cyano group-containing unit, and wherein a mass ratio of a content (% by mass) of the quinacridone pigment to a content (% by mass) of the fluorescent dye is 1.0 times or less.

2. The aqueous fluorescent ink according to claim 1, wherein a sum of the content (% by mass) of the fluorescent dye and the content (% by mass) of the quinacridone pigment is 0.10% by mass or more to 1.50% by mass or less based on a total mass of the ink.

3. The aqueous fluorescent ink according to claim 1, wherein a mass ratio of a content (% by mass) of the resin particle to the content (% by mass) of the quinacridone pigment is 9 times or more to 100 times or less.

4. The aqueous fluorescent ink according to claim 1, wherein a cumulative 50% particle diameter of the resin particle in a volume-based particle size distribution is 140 nm or more to 300 nm or less.

5. The aqueous fluorescent ink according to claim 1, wherein the quinacridone pigment is a solid solution pigment composed of two or more kinds of quinacridone pigments.

6. An ink cartridge comprising an ink, and an ink storage portion storing the ink, wherein the ink comprises the aqueous fluorescent ink according to claim 1.

7. An ink jet recording method of recording an image onto a recording medium by ejecting an ink from an ink jet recording head, wherein the ink comprises the aqueous fluorescent ink according to claim 1.

8. The aqueous fluorescent ink according to claim 1, wherein the mass ratio of the content (% by mass) of the quinacridone pigment to the content (% by mass) of the fluorescent dye is 0.1 times or more.

9. The aqueous fluorescent ink according to claim 1, wherein the content (% by mass) of the quinacridone pigment is 0.01% by mass or more to 0.70% by mass or less based on a total mass of the ink.

10. The aqueous fluorescent ink according to claim 1, wherein a content (% by mass) of the resin particle is 1.00% by mass or more to 10.00% by mass or less based on a total mass of the ink.

11. The aqueous fluorescent ink according to claim 1, wherein the content (% by mass) of the fluorescent dye is 0.01% by mass or more to 5.00% by mass or less based on a total mass of the ink.

12. The aqueous fluorescent ink according to claim 1, wherein the content (% by mass) of the fluorescent dye is 0.05% by mass or more to 1.00% by mass or less based on a total mass of the ink.

13. The aqueous fluorescent ink according to claim 1, wherein the content (% by mass) of the fluorescent dye in the resin particle is 1.0% by mass or more to 15.0% by mass or less.

14. The aqueous fluorescent ink according to claim 1, wherein a sum of the content (% by mass) of the fluorescent dye and the content (% by mass) of the quinacridone pigment is 0.10% by mass or more to 1.50% by mass or less based on a total mass of the ink, wherein the content (% by mass) of the quinacridone pigment is 0.01% by mass or more to 0.70% by mass or less based on the total mass of the ink, and wherein the content (% by mass) of the fluorescent dye is 0.05% by mass or more to 1.00% by mass or less based on the total mass of the ink.

15. The aqueous fluorescent ink according to claim 1, wherein the quinacridone pigment is dispersed in the ink by a resin dispersant.

16. The aqueous fluorescent ink according to claim 1, wherein the basic dye having the xanthene skeleton comprises at least one selected from the group consisting of C.I. Basic Red 1, C.I. Basic Red 1:1, C.I. Basic Violet 11, and C.I. Basic Violet 11:1.

17. The aqueous fluorescent ink according to claim 1, wherein the resin particle has a core portion and a shell portion covering the core portion.

18. The aqueous fluorescent ink according to claim 1, wherein the resin particle has a cross-linked structure.

* * * * *